(12) United States Patent
Ghanbari

(10) Patent No.: US 8,149,916 B2
(45) Date of Patent: Apr. 3, 2012

(54) VIDEO CODING AND DECODING

(75) Inventor: Mohammed Ghanbari, Essex (GB)

(73) Assignee: British Telecommunications plc, London (GB)

( * ) Notice: Subject to any disclaimer, the term of this patent is extended or adjusted under 35 U.S.C. 154(b) by 394 days.

(21) Appl. No.: 12/385,997

(22) Filed: Apr. 27, 2009

(65) Prior Publication Data

US 2009/0232214 A1    Sep. 17, 2009

Related U.S. Application Data

(62) Division of application No. 10/111,660, filed as application No. PCT/GB00/04504 on Nov. 27, 2000, now Pat. No. 7,742,529.

(30) Foreign Application Priority Data

Nov. 26, 1999  (GB) .................................. 9928022.4

(51) Int. Cl.
*H04N 7/12*      (2006.01)
*H04N 11/02*    (2006.01)
*H04N 11/04*    (2006.01)

(52) U.S. Cl. .............................. 375/240.16; 375/240.27
(58) Field of Classification Search ............. 375/240.16, 375/240.27
See application file for complete search history.

(56) References Cited

U.S. PATENT DOCUMENTS

| | | | |
|---|---|---|---|
| 5,410,553 A | | 4/1995 | Choon |
| 5,568,200 A | * | 10/1996 | Pearlstein et al. ....... 375/240.27 |
| 5,727,088 A | * | 3/1998 | Kim .............................. 382/238 |
| 5,751,378 A | * | 5/1998 | Chen et al. .................... 348/700 |
| 6,005,643 A | * | 12/1999 | Morimoto et al. ........ 375/240.26 |
| 6,097,842 A | * | 8/2000 | Suzuki et al. ................. 382/232 |

FOREIGN PATENT DOCUMENTS

| | | |
|---|---|---|
| CA | 2432740 | 4/1997 |
| CA | 2255900 | 8/2002 |
| EP | 0551599 A1 | 7/1993 |
| EP | 0588586 A2 | 3/1994 |
| WO | 98/42137 | 9/1998 |

OTHER PUBLICATIONS

International Preliminary Examination Report dated Jan. 22, 2002.
Lim, et al., "Cell Loss Concealment and Packetization in Packet Video," *Int. J. Imag. Syst. Technol.*, Special Issue on Image and Video Compression, vol. 10, No. 1, pp. 54-58 (1999).
Ghanbari, et al., "Cell-Loss Concealment in ATM Video Codecs," *IEEE Transactions on Circuits and Systems for Video Technology*, vol., 3, No. 3, pp. 238-247 (Jun. 1993).
Lam, et al., "Recovery of Lost or Erroneously Received Motion Vectors" in Proc. ICASSP, Minneapolis, MN, pp. V417-V420 (Apr. 1993).

(Continued)

*Primary Examiner* — Mehrdad Dastouri
*Assistant Examiner* — Jeremaiah Hallenbeck-Huber
(74) *Attorney, Agent, or Firm* — Nixon & Vanderhye PC

(57) ABSTRACT

A decoder for video signals, such as MPEG, which uses motion-compensated bidirectional predictive coding, performs concealment of lost or corrupted portions of a picture. For this purpose, it estimates missing motion vectors by combining the two vectors which accompany a bidirectionally coded frame to create a substitute vector. An encoder can be modified to enhance this decoder operation, including forcing at least one frame per group of frames to be coded using bidirectional prediction, and constraining the two vectors so that the substitute vector is closer to the wanted value.

4 Claims, 6 Drawing Sheets

OTHER PUBLICATIONS

Wada, "Selective Recovery of Video Packet Loss Using Error Concealment," *IEEE Journal on Selected Areas in Communications*, vol. 7, No. 5, pp. 807-814 (Jun. 1989).

Shanableh, et al., "Backward Tracking of B-pictures Bidirectional Motion for Interframe Concealment of Anchor Pictures," Proceedings of the IEEE International Conference on Image Processing 2000, vol. 3, pp. 396-399 (Sep. 2000).

Sun, et al., "Error Concealment in Digital Simulcast AD-HDTV Decoder," IEEE Transactions on Consumer Electronics, vol. 38, No. 3, pp. 108-118 (Aug. 1992).

Arnold, et al., "Error Resilience in the MPEG-2 Video Coding Standard for Cell Based Networks—A Review," *Signal Processing Image Communication*, vol. 14, pp. 607-633 (1999).

Chen, et al., "Error Control for H.263 Video Transmission over Wireless Channels," 1998 IEEE (May 31, 1990).

Wu, et al., "Joint Estimation of Forward and Backward Motion Vectors for Interpolative Prediction of Video," IEEE Transactions on Image Processing, No. 5, New York, USA (Sep. 3, 1994).

Vetro, et al., "True Motion Vectors for Robust Video Transmission," Visual Communications and Image Processing '99, San Jose, CA, USA, Jan. 25-27, 1999, vol. 3653, pt. 1-2, pp. 230-240, Proceedings of the SPIE—The International Society for Optical Engineering, SPIE—Int. Soc. Opt. Eng., USA ISSN: 0277, 786X (1998).

Shanableh, "Loss Concealment Using B-Pictures Motion Information," 2003 IEEE Transactions on Multimedia, vol. 5, No. 2 (Jun. 2003).

* cited by examiner

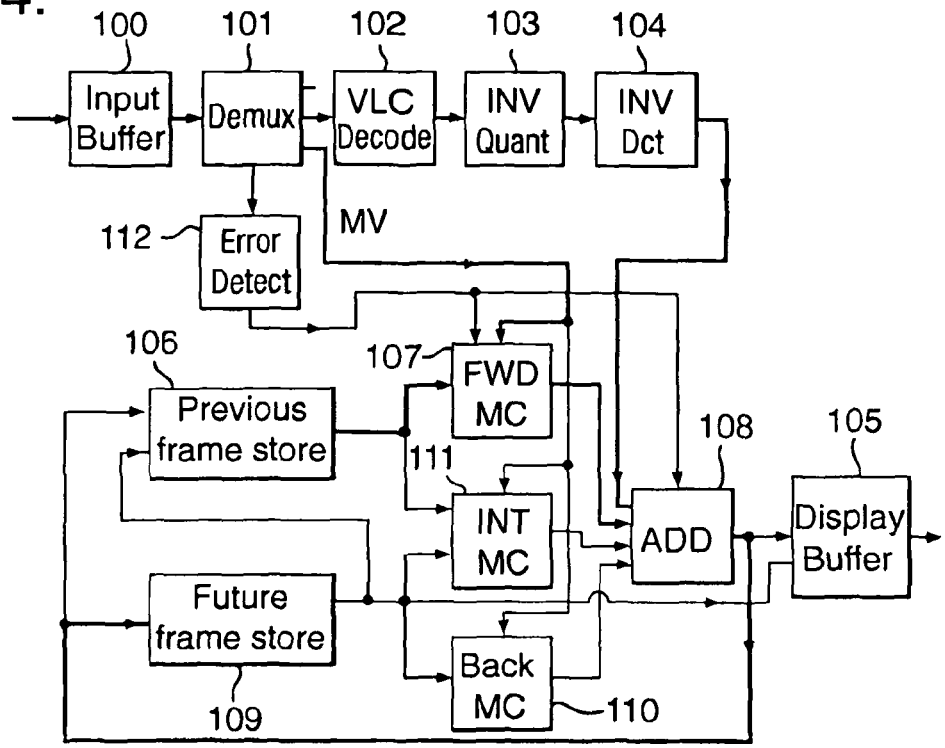
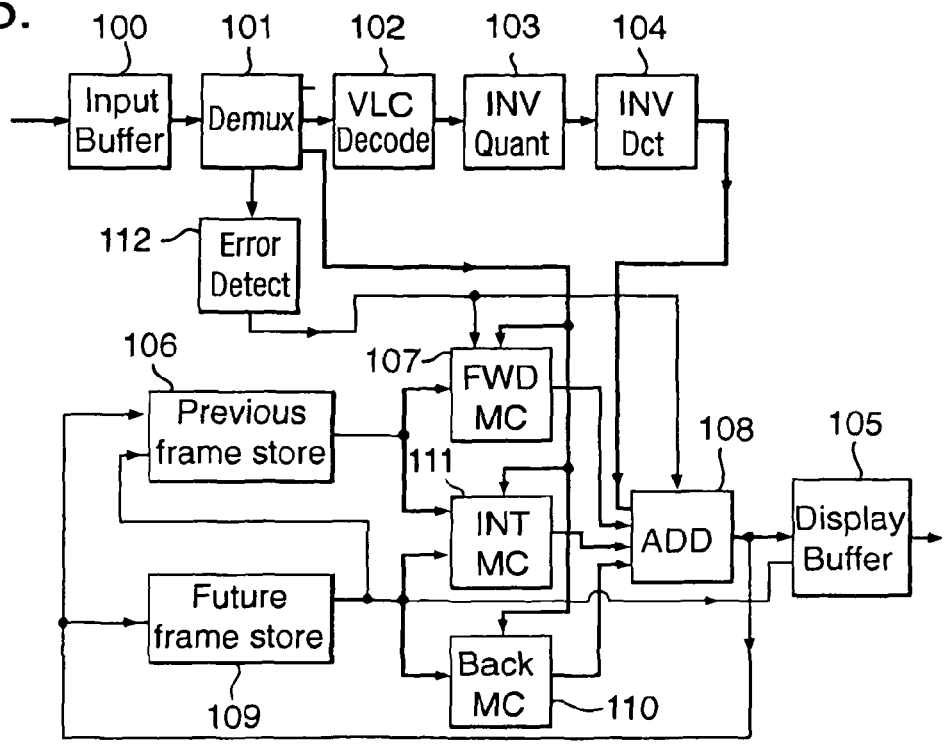

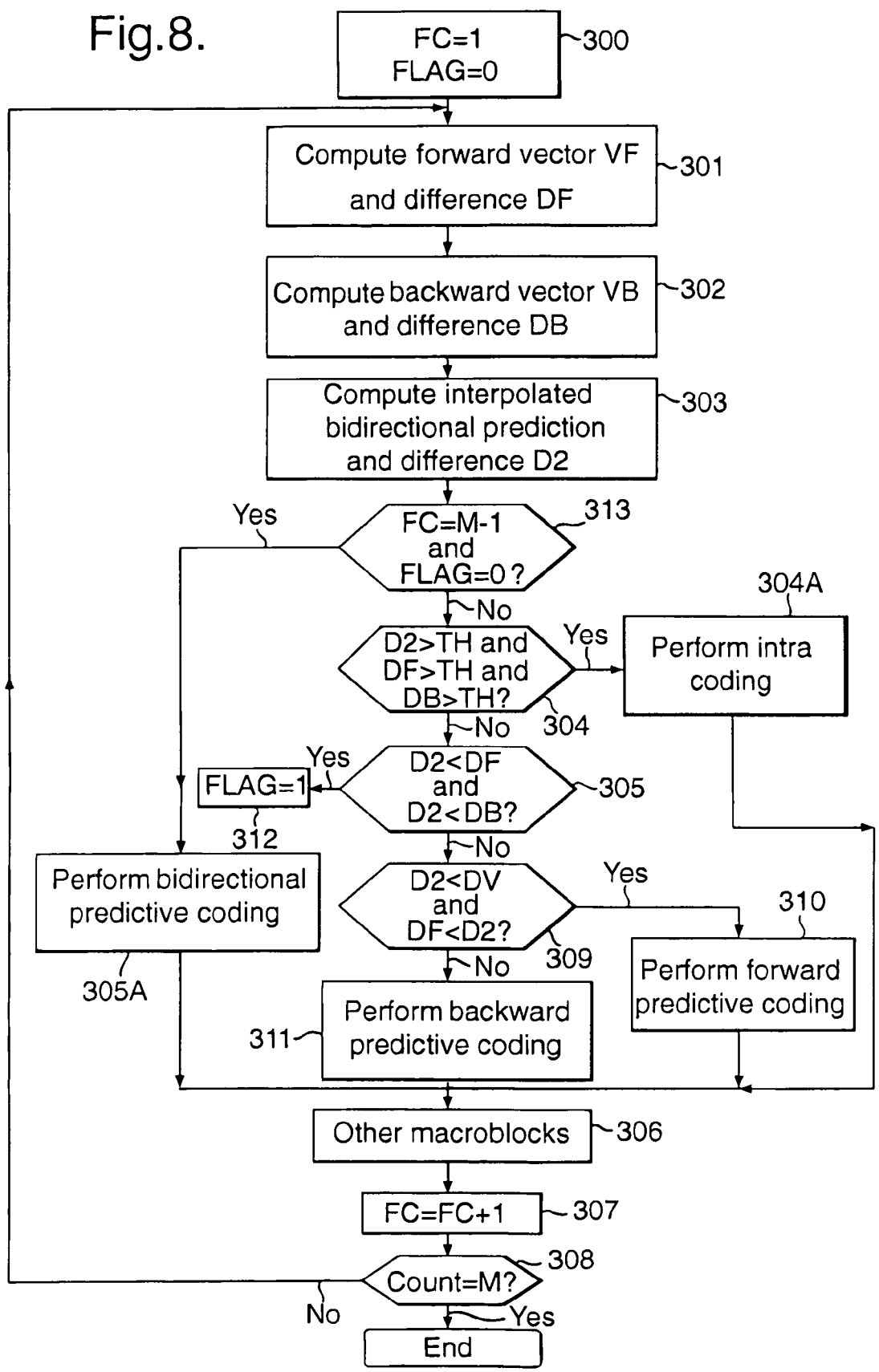

VIDEO CODING AND DECODING

CROSS-REFERENCE TO RELATED APPLICATIONS

This application is a division of Ser. No. 10/111,660 filed Apr. 26, 2002, which was the U.S. National Phase of International Patent Application No. PCT/GB2002/04504 filed Nov. 27, 2000, which claims priority under 35 U.S.C. §119 based on United Kingdom Patent Application No. GB 9928022.4 filed Nov. 26, 1999, the contents of all of which are hereby incorporated by reference.

BACKGROUND

1. Technical Field

The present invention concerns the coding and decoding of video signals using inter-frame motion-compensated predictive coding, and more especially to techniques directed towards the concealment, in the decoded pictures, of degradation caused by transmission errors.

Details of the invention will be described in the context of video signals encoded and decoded in accordance with the so-called MPEG-1 system, as defined in the standard ISO-11172. However, the invention can also be used with other coding schemes in which some pictures are coded using bidirectional prediction.

2. Related Art

In MPEG, some frames of the video signals are coded independently of other frames—i.e., without using inter-frame predictive coding. These are called intra- or I-frames. Other frames are coded using inter-frame predictive coding in which one codes only the difference between the frame being coded and a prediction generated from one or more other frames of the video signal. These inter-frames are of two types, one of which is the predicted, or P-frame, where the prediction is formed from the preceding I- or P-frame. The I- and P-frames are sometimes referred to generically as anchor frames, because they can be used as reference frames for predictions, in contradistinction to the second type of predicatively coded frame, the bidirectional or B-frame, which is not so used. For the B-frame, the prediction is chosen, according to the picture content, to be from the preceding anchor frame, the following anchor frame, or a weighted sum of predictions from both, whichever gives the best results (in the case of a weighted sum, the weights are determined by the relative temporal proximity of the B-frame to the two anchor frames). Note that this decision is not taken for the frame as a whole; rather, the frame is divided into macroblocks and the decision is taken for that macroblock. If predictive coding is judged to be unsatisfactory for a particular macroblock, that macroblock may be coded without prediction (i.e., in the same manner as for an I-frame): this also applies to P-frames.

Further coding proceeds in that, for each macroblock, the picture element (pixel) values (in the case of an I-frame or intra-macroblock of a P- or B-frame) or the inter-frame pixel differences (in the case of differential coding) are transformed using the discrete cosine transform (DCT): for this purpose, each macroblock (16×16 pixels) is divided into four 8×8 blocks.

The division of the video signal into different types of frame is as follows. The sequence of frames to be coded is divided into Groups of Pictures, each of which is a series of one or more frames. Each group contains N frames (N≧1), and begins with an I-frame, followed by P-frames at regular intervals. Between these anchor frames are B-frames, so that the anchor frames are M frames apart (i.e., there are M−1 B-frames between each pair of consecutive anchor frames). Neither the P nor B-frames need to be present. Commonly, for a 625-line, 25-frame-per-second system, N=12 and M=3. In this description, two successive anchor frames and the B-frames which lie between them are referred to together as a "sub-group."

FIG. 1 shows a series of thirteen frames from such a signal, in the order in which they are captured by a camera or displayed at a receiver. The frames are marked I, P or B. The order of prediction is indicated by arrows, the arrow-head pointing from the anchor frame used as reference for the prediction towards the frame which is to be coded using that prediction. Thus, for example, the prediction for frame $B_9$ is to be performed by bidirectional prediction from frames $P_4$ and $P_7$. Because of the use of backward prediction, the frames cannot be coded in the order shown; for example, frame $P_7$ must be coded before frame $B_9$. To indicate this, the frames are numbered in the order in which they are coded.

When coding a macroblock in, for example, frame $P_7$ using frame $P_4$ as reference, then in principle one can take, as one's prediction for differential coding, the correspondingly positioned macroblock in frame $P_4$. However, because of movement in the scene, this may not be optimum and, therefore, the MPEG standard uses motion-compensated predictive coding whereby one takes as one's prediction an area of the reference frame the same size and shape as the macroblock, but offset from it by an amount referred to as a motion vector. This vector is transmitted along with the difference information. In the case of a bidirectionally coded macroblock within a B-frame, of course two motion vectors are sent.

FIG. 2 is a simplified block diagram of a conventional MPEG encoder. Incoming frames, received in the order shown in FIG. 1, are first buffered in a reordering unit 1 and read out in the order indicated by the numbers in FIG. 1. In the case of an I-frame, or an intra-macroblock of a P- or B-frame, the pixel values are subjected to the discrete cosine transform at 2, quantization 3, variable-length coding 4 and fed to an output buffer 5. Because the data rate at this point varies according to picture content, a buffer control unit 6 monitors the buffer fullness and controls the quantizer 3 so that the buffer 5 can output to a fixed bit-rate line without overflow or underflow.

The output of the quantizer 3 is decoded by a local decoder consisting of an inverse quantizer 7 and an inverse DCT unit 8 and stored in a frame store 9.

In the case of a predicted macroblock within a P-picture, a motion estimation unit 10 evaluates the optimum motion vector for prediction and the relevant shifted region of the previous anchor frame stored in the frame store 9 is read out. This is subtracted from the incoming signal in a subtractor 11 and the difference is then coded just as described above. In this case, the local decoder also employs an adder 12 to add the subtracted signal back in to form a decoded frame which is again stored in the frame store 9.

Note that the frame store 9 actually stores two frames, so that when coding, for example, frames $B_{14}$ and $B_{15}$, frames $I_{10}$ and $P_{13}$ are both available for prediction purposes. In the case of coding of a B-frame, the motion estimation unit 10 evaluates the macroblock to be coded against the two frames stored in the frame store 9 to decide whether to use forward, backward or bidirectional prediction, and produce the necessary motion vector or vectors. The relevant prediction is generated from the contents of the frame store 9 and fed to the subtractor 11, following which further coding of the macroblock takes place as before. Note, however, that B-frames are not decoded for entry into the frame store 9 as they are not needed for prediction purposes.

In the context of the present invention, we are interested in the decoding of coded video signals following transmission (or, perhaps recording and replay), when errors may occur. These may be of brief duration, or may persist for some time: for example, in packet-switched networks, network congestion may cause delays exceeding the maximum delay that a decoder can accommodate, so that a whole packet is effectively lost. Even brief errors can cause considerable disruption if they cause loss of synchronization of information coded using variable-length codes. Inherently, the use of inter-frame coding means that corruption of an anchor frame propagates into subsequent frames.

It has already been proposed to conceal the missing parts of frames occasioned by such errors by copying from another frame. Indeed, the MPEG standard makes some provision for this by providing that an I-frame may contain motion vectors which are normally unused, but can, in the event that a macroblock is lost, be used to make a prediction from the preceding anchor frame, which can then be displayed instead. This vector is transmitted in the macroblock directly below the macroblock to which it is applied. However, in the event of the loss of a significant portion, or all, of a frame, this concealment fails, because the concealment vectors are also lost.

BRIEF SUMMARY

According to one aspect of the invention, there is provided an apparatus for decoding video signals coded by inter-frame differential coding in which some frames are coded by bidirectional motion-compensated prediction, comprising:

means for recognizing errors in received signals corresponding to one or more parts of a received frame to be decoded, means responsive to such recognition to substitute for a said part of the frame to be decoded part of another decoded frame offset by an amount determined by a motion vector, characterized by:

motion vector estimation means operable to generate the motion vector by forming the difference of the two motion vectors which, in the received signal, accompany a bidirectionally coded frame which has as its two reference frames the frame being decoded and the frame which is to be used for substitution.

In another aspect, the invention provides a method of coding video signals including coding groups of frames by motion-compensated predictive coding relative to two other frames as reference frames, in accordance with an algorithm in which a region of a frame of the group is coded as a selected one of a plurality of possible methods which includes:

a) forming the difference between that region and a portion of a first one of the reference frames, and a motion vector specifying the position of that portion of the first one the reference frames relative to the region being coded;

b) forming the difference between that region and a portion of the second of the reference frames, and a motion vector specifying the position of that portion of the second of the reference frames relative to the region being coded; and c) forming the difference between that region and a combination of a portion of a first one of the reference frames and a portion of the second of the reference frames, a first motion vector specifying the position of that portion of the first one of the reference frames relative to the region being coded and a second motion vector specifying the position of that portion of the second of the reference frames relative to the region being coded;

wherein, for any region, that region is in one frame of the group coded using method (c) and the same region is, in other frames of the group, coded by one of said plurality of methods selected in dependence on a criterion as to the degree of similarity between the region being coded and, respectively, the said portion of the first reference frame, the said portion of the second reference frame and the said combination.

In a third aspect of the invention, we provide a method of coding video signals including the step of coding a region of a frame by bidirectional motion-compensated predictive coding, relative to a past and a future reference frame, the method further including:

a) identifying a future predictor portion of the past reference frame, being that portion within a defined search area of the past reference frame which bears the greatest similarity to the region of the future reference frame which corresponds to the region being coded, and a future motion vector specifying the position of said predictor portion relative to the region to be coded;

b) identifying within a defined search area of the past reference frame a forward predictor portion of the past reference frame, and a first motion vector specifying the position of said predictor portion relative to the region to be coded; and c) identifying within a defined search area of the future reference frame a backward predictor portion of the future reference frame, and a second motion vector specifying the position of said predictor portion relative to the region to be coded;

the criterion for identification of the said forward predictor portion and backward predictor portion being that the sum of the future motion vector and the backward motion vector shall be equal to the forward motion vector, and that a combined similarity measure representing a combination of (A) the similarity of the forward predictor portion of the past reference frame to the region to be coded and (B) the similarity of the backward predictor portion of the past reference frame to the region to be coded shall be substantially maximized.

Other preferred aspects of the invention are set out in the sub-claims.

BRIEF DESCRIPTION OF THE DRAWINGS

Some embodiments of the invention will now be described with reference to the accompanying drawings, in which:

FIGS. 4 and 5 illustrate different modes of operation of the decoder of FIG. 3;

FIG. 8 is a flowchart of the operation of an encoder modified in accordance with a third embodiment of the invention.

DETAILED DESCRIPTION OF EXEMPLARY EMBODIMENTS

Figure 3:
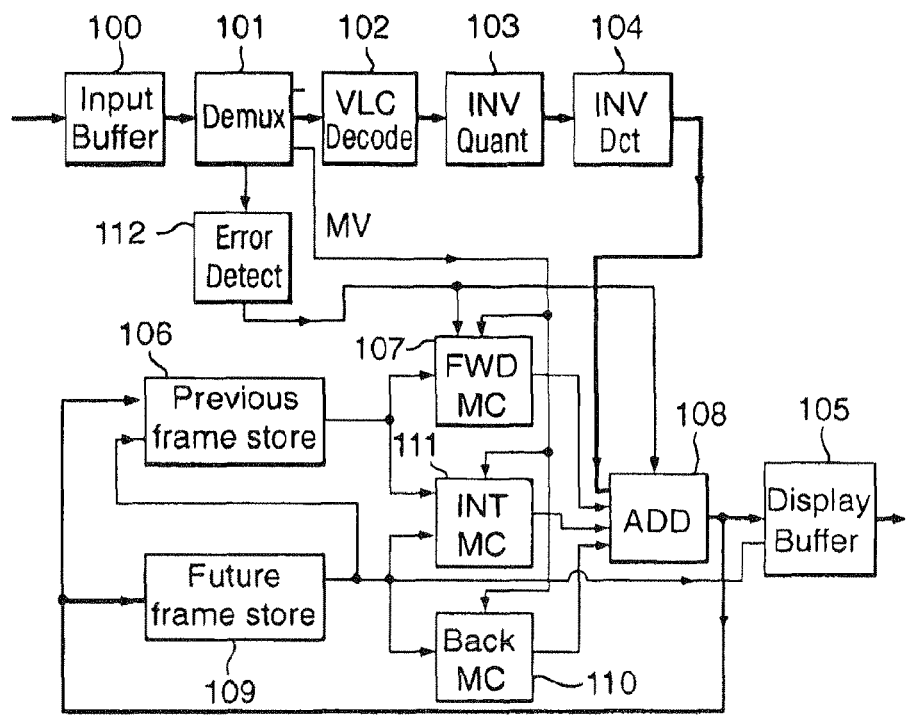
FIG. 3 is a block diagram of a known decoder.

Before describing a decoder constructed according to the invention, the operation of a conventional MPEG decoder will be outlined, with reference to FIG. 3. Signals to be decoded are received at an input buffer 100. A demultiplexer 101 separates control information (including, for example, signals which indicate whether a macroblock uses intra- or inter-frame coding), DCT coefficients and motion vectors.

When an I-frame is being received, the DCT coefficients are processed by a variable-length decoder 102, inverse quantizer 103, and inverse DCT unit 104. The resulting decoded frame is entered, via an adder 108 which, in this case, receives no other input and, therefore, performs no addition into a "future frame" frame store 109.

Prior to decoding of the P-frame which follows, the I-frame (or more generally, the preceding anchor frame) stored in the "future frame" frame store 109 is entered into a display buffer 105 and also copied into a "previous frame" frame store 106. (Naturally, the first frame of a transmission could be loaded directly into the frame store 106 and buffer 105, but in the case of subsequent I-frames, this cannot be done until any intervening B-frames have been processed).

When a P-frame is being received, the motion vectors are used by a forward motion compensation unit 107 to select the required parts of the previous anchor frame stored in the frame store 106 and add these in the adder 108 to the pixel difference values output from the inverse DCT unit 104 to produce the decoded frame which is then stored in the "future picture" frame store 109. This is illustrated in FIG. 4, which is identical to FIG. 3, except that the signal paths now in use are shown in heavy lines.

In the case of a B-frame, the situation is as shown in FIG. 5. Now, the two previous anchor pictures (that is, previously received, although in terms of capture and display order, they are the preceding and following frames) are present in the frame stores 106, 109. For any given macroblock, the control signals indicate whether the encoder used a prediction from the previous or future frames or from both and, accordingly, the motion vector or vectors are used by the forward motion compensation unit 107, a backward motion compensation unit 110, or a bidirectional motion compensation unit 111 to select the required parts of the previous anchor frame or frames stored in the frame store 106 and/or 109 and add these in the adder 108 to the pixel difference values output from the inverse DCT unit 104 to produce the decoded frame which is then forwarded to the display buffer 105. In the case of bidirectional prediction, the bidirectional motion compensation unit 111 forms a weighted sum of the outputs of the two frame stores in proportions determined by the control signals.

Once the two (in this example) B-frames have been decoded, the frame stored in the "future frame" frame store 109 is transferred to the output buffer 105 and copied to the "previous frame" frame store 106, overwriting the frame already present there, which is of no further use. The buffer store 109 is now ready to receive the next anchor frame.

In order to implement concealment in I-frames using concealment motion vectors which are contained later in the same frame, an error detector 112 recognizes that corruption of the input signal has occurred, for example, by detecting the absence of expected addresses (such as packet numbers or, in ATM systems, cell sequence numbers), loss of synchronization or failure of error checks. If a macroblock has been detected as corrupted or missing, a control signal from the error detector forces the forward motion compensation unit into operation to select an appropriate region of the frame in the frame store 106 according to the value of the concealment motion vector contained in the next macroblock below the one being considered, and forward this to the future frame store 109 in lieu of the output of the inverse DCT unit 104.

Figure 6:
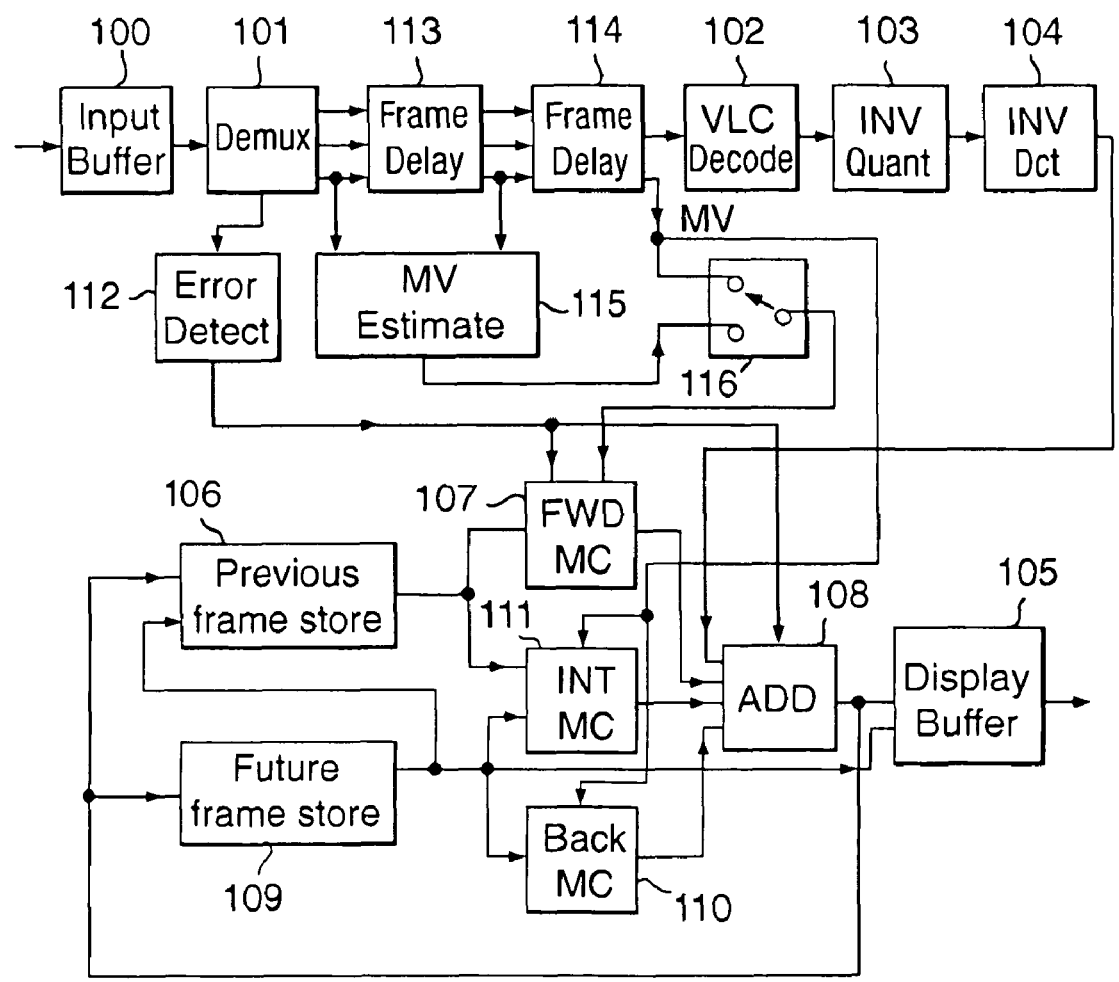
FIG. 6 is a block diagram of a decoder in accordance with one embodiment of the invention.

FIG. 6 shows an MPEG decoder modified in accordance with a first embodiment of the invention. This operates in the same manner as described above in relation to FIGS. 3 to 5, except that it applies a further concealment process. This process is not applied to B-frames. It is applied within a P-frame to any macroblock for which an error is indicated, and it is applied within an I-frame to any macroblock for which an error is indicated yet the concealment vector is unavailable (e.g., because the macroblock below it is also corrupted, or of course because the macroblock in question is at the bottom of the picture). The process, like that using the concealment vectors for the I-frames, performs concealment by copying a suitable portion of the previous anchor frame stored in the "previous frame" frame store 106. For example, errors in frame $P_7$ might be concealed by copying from frame $P_4$. The difficulty faced is in finding a suitable motion vector to determine the part of the previous anchor frame to be copied. This problem is solved by making use of the motion vectors contained in the B-frames which, in the received signal, follow the frame being decoded (naturally, they actually precede it in capture and display order). In order that these be accessible, the decoder has two one-frame delays 113, 114 following the demultiplexer 101, so that, at the same time as a macroblock of the anchor frame (e.g., frame $P_7$ or, more generally, $P_i$) is appearing at the output of the delay 114, the corresponding macroblock in each of the two B-frames (i.e., $B_8$ or $B_{i+1}$ and $B_9$ or $B_{i+2}$) appears at the output of the multiplexer 101 and the delay 113, respectively.

Figure 1:
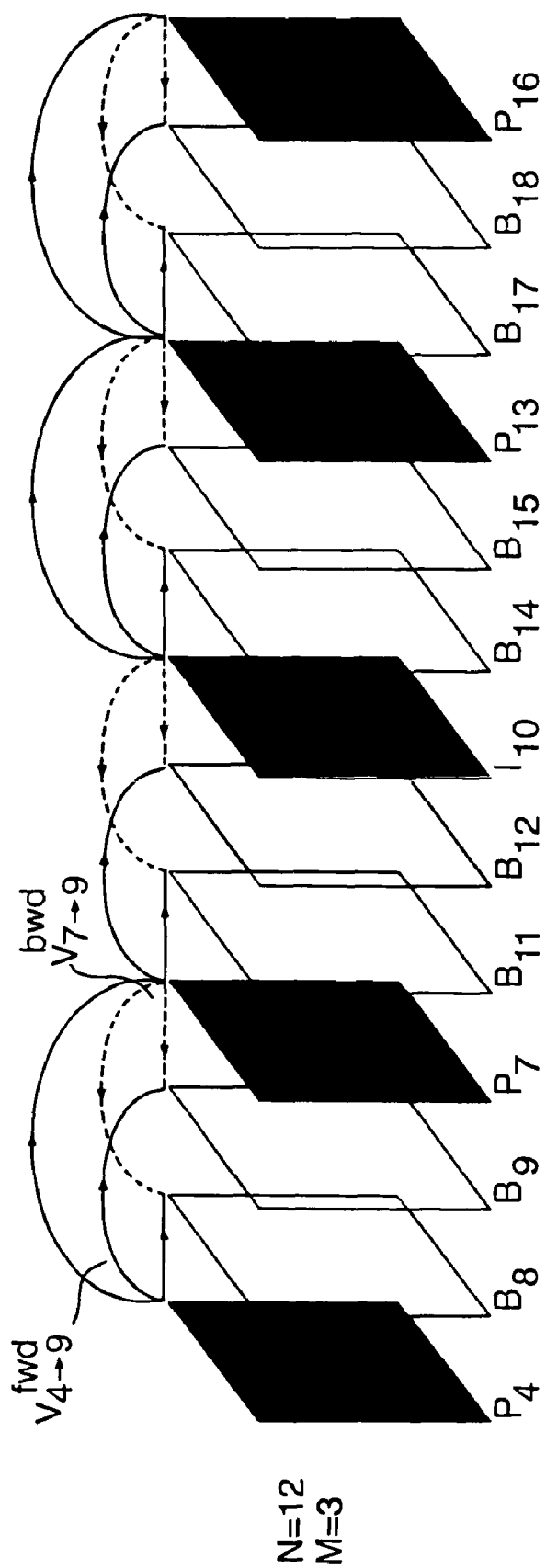
FIG. 1 shows a video frame sequence in accordance with the MPEG standard.

If the corresponding macroblock of frame $B_9$ is coded by bidirectional prediction, then two vectors will be available from this frame, being the forward vector $V_{4 \to 9}^{fwd}$ from frame $P_4$ and the backward vector $V_{7 \to 9}^{bwd}$ from $P_7$ (these vectors are marked in FIG. 1). The vector $V_{4 \to 7}^{est}$ we require for concealment of $P_7$ can be estimated as the difference of these two vectors, i.e.:

$$V_{4 \to 7}^{est} = V_{4 \to 9}^{fwd} - V_{7 \to 9}^{bwd} \quad (1)$$

If, however, frame $B_9$ is not bidirectionally predicted, then an alternative estimate—though perhaps not quite as good—may be available by performing a similar calculation for frame $B_8$:

$$V_{4 \to 7}^{est} = V_{4 \to 8}^{fwd} - V_{7 \to 8}^{bwd} \quad (2)$$

If neither of the B-frames is bidirectionally predicted, then estimates might be made by scaling the forward or backward vectors from those frames, i.e., in a suggested order of preference, should more than one of them be available:

a scaled version of the forward motion vector of the second B-frame:

$$\frac{3}{2} V_{4 \to 9}^{fwd}$$

a scaled version of the forward motion vector of the first B-frame: $3 V_{4 \to 8}^{fwd}$ a scaled version of the inverse of the backward motion vector of the first B-frame:

$$-\frac{3}{2} V_{7 \to 8}^{bwd}$$

a scaled version of the inverse of the backward motion vector of the second B-frame: $-3 V_{7 \to 9}^{bwd}$ Finally, if none of these vectors is available, then the substitution may still be made, but with a null motion vector (i.e., one simply copies the corresponding macroblock of the previous anchor frame).

Figure 7:
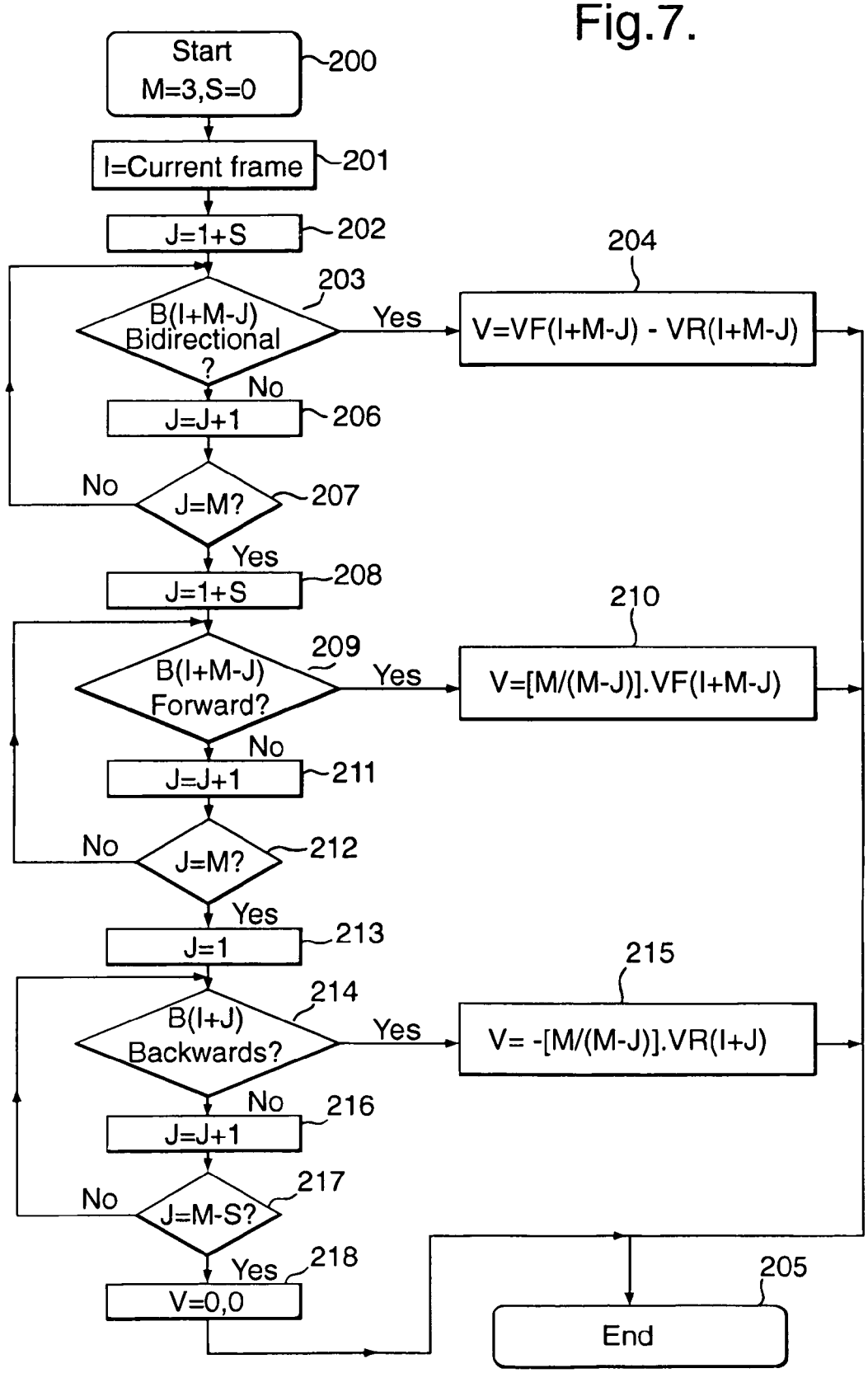
FIG. 7 is a flowchart of the operation of an encoder modified in accordance with a second embodiment of the invention.

The formation of the estimated motion vector is performed, in the apparatus of FIG. 6, by a motion vector estimation unit 115 which may conveniently be performed by a stored program controlled processor programmed to perform the process set out in the flowchart of FIG. 7. Indeed, some other parts of the decoder may, as is conventional, be performed by such a processor, in which case a single processor may perform more than one function.

Whenever the error detector 112 detects a corrupted (or missing) macroblock within an I- or P-frame, it signals this fact (unless the macroblock of an I-frame is to be concealed using vectors from an adjacent uncorrupted macroblock within the same frame) to the vector estimation unit 115 and also switches the forward motion compensation unit 107 to receive its motion vectors from the unit 115 instead of from the delay 114. This is indicated by a changeover switch 116. At the same time as the I- or P-frame is being output from the delay 114, the vector estimation unit 115 receives from the demultiplexer 101 and delay 113 the motion vectors and control information in respect of the two B-frames which, in the input signal, follow it. The control information is needed to ascertain whether each B-frame macroblock is predicted by forward, backwards or bidirectional prediction, or is intra-coded.

The process shown in FIG. 7 will now be described on the assumption that there are only two B-frames to be considered. In fact, the parameters shown in FIG. 7 do not presuppose this: for the present, we assume that M=3 and S=0. The process starts at 200. At 201, an index I is set to the number of the frame currently being decoded; thus, if the frame is $P_7$, then I=7. A pointer J, whose function is to point successively to the last, and then successively earlier B-frames, is initialized (at 202) to 1. Then, in step 203, the control signals for frame $B_{I+M-J}$ (e.g., $B_7$) are examined to ascertain if the corresponding macroblock of this frame is bidirectionally predicted: if so, then at 204 the required estimated motion vector is generated by subtracting the forward and backward vectors for that frame, and the process terminates at 205. Otherwise, the pointer J is incremented at 206 to point to the preceding B-frame, and the process is repeated from step 203. When, on subsequent iterations, J reaches M, then this loop is interrupted at 207, and at 208 J is reinitialized to 1 in preparation for a similar loop comprising steps 209 to 212 which checks whether the corresponding macroblock of each B-frame, proceeding backwards in time, used forward prediction, in which case the estimated motion vector is set in step 210 to be a scaled version of the first forward vector found. Should no backward predicted B-frame macroblock be found either, then a third search is commenced, for a B-frame with a backward predicted macroblock. In this case, the pointer J, reinitialized at 213, points first to the earliest B-frame, so that the first frame to be examined in step 214 is frame $B_{I+J}$ (e.g., $B_8$). If this has a reverse vector, then the estimate V is set at 215 to the inverse of the reverse vector, appropriately scaled; otherwise, the process is repeated as before via steps 216, 217. Finally, if all the B-frames have intra-coded macroblocks at the relevant position, the estimate is set to a null vector 0,0 in step 218.

If, in fact, M>3, so that there are more than two B-frames per sub-group, then this can be accommodated provided that a corresponding number of frame delays are provided in addition to the two delays 113, 114 shown in FIG. 7—that is, a total of M−1 such delays. Naturally, there may be a limit to how much delay is considered acceptable for a particular application. If M exceeds D+1, where D is the number of delays, this can be accommodated, but the penalty for this is that the later B-frames are not accessible and cannot be used for motion vector estimation. In this case, the process shown in FIG. 7 must be modified by setting S=M−D−1.

In this description, it has been assumed that substitution using concealment vectors carried in the I-frames is, where these are available, carried out in preference to the method proposed; although this is the preferred option, it is not essential to the invention that this conventional concealment method also be used. Conversely, the method may also be used in combination with other methods of concealment, such as intra-frame concealment where pixel information is generated by interpolation from adjacent macroblocks, or intra-frame concealment using motion vectors borrowed from adjacent macroblocks. In such cases, one would proceed by establishing a hierarchy, similar to that discussed earlier, to determine an order of precedence for the different options, should more than one be possible in any particular case.

It should also be observed that, although the described embodiment of the invention assumes a signal format as defined by the MPEG standard, this is not essential; it is not, for example, material whether transform coding is used. Moreover, the particular format of I-, P-, and B-frames is not essential either. In particular, as regards the current frame (i.e., the frame in which concealment is being performed), it is not important how the frame was originally coded (since this information is lost). As regards the frame used as the source for picture information used for concealment, it is not material how this was coded either, nor indeed (apart from delay considerations) whether it is before or after the current frame, although it is necessary that the part being used for concealment is actually available, which necessarily dictates that it must not have been coded by a predictive method using, as a reference, the part of the current frame which is to be concealed. It is, of course, a prerequisite to such concealment that the signal should contain some frames which are, at least in part, coded using bidirectional prediction.

Figure 2:
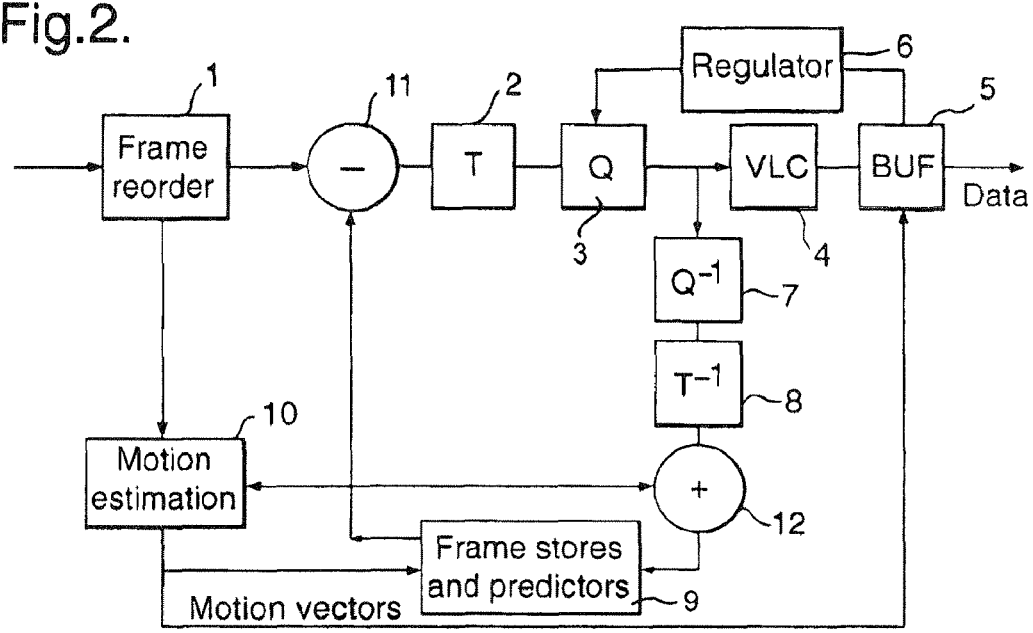
FIG. 2 is a block diagram of a known encoder.

The decoder described above will work with signals produced by a conventional encoder. In a further embodiment of the invention, however, we propose a modified encoder with a view to improving the efficiency of concealment. It will be noticed that the concealment performed by the decoder of FIG. 7 will be inferior in the case of macroblocks for which none of the available B-frames uses bidirectional coding. Thus, it is proposed to alleviate this situation by, for each macroblock position, forcing the encoder to employ bidirectional predictive coding for at least one B-frame in every sub-group. This is achieved by, in the encoder of FIG. 2, modifying the motion estimation unit 9 so as to override the decision that it would normally make as to the type of prediction (if any) which is to be used. Naturally, this results in a non-optimum prediction for the B-frame in question and hence an increase in data rate or a reduction in picture quality. However, because B-frames do not serve as a basis for predictive of other frames, some loss of quality is considered to be an acceptable price to pay for improving the quality of the anchor frames, since degradation of these can propagate into later frames. A simple option would be to force bidirectional prediction of the last B-frame of each sub-group. However, in the interests of minimizing disturbance to the B-frame coding, one might prefer to force bidirectional prediction for any macroblock of this last frame only if the encoder has not chosen bidirectional coding for the corresponding macroblock of any other B-frame within the same sub-group. It is not essential that it be the last frame that forcing is applied to, though this is the most convenient one to choose.

FIG. 8 is a flowchart showing the operation of a modified motion estimation unit, under the second of these assumptions. First, we describe the conventional parts of its operation (i.e., ignoring the modifications). The process starts at 300 for a new sub-group of B-frames, and a frame counter FC is set to 1. Then in step 301, the forward motion vector VF is computed, and also the difference DF, that is, the sum of the absolute values of the differences between each pixel of the current macroblock and a macroblock-sized region of the past anchor frame having a position the same as the current macroblock, but offset by the amount of the motion vector (the sum of absolute values is commonly used as it requires little computation; however, the sum of squares (or other monotonically increasing even function) can be used instead). In step 302, the same process is performed to obtain the backward motion vector and the corresponding difference with the future anchor frame. In step 303, a weighted sum of predictions from both anchor frames is formed and the sum of absolute differences D2 between this prediction and the current macroblock calculated. These differences are checked at 304 and, if all the differences exceed a threshold value TH, then intra-coding is performed at 304A. Otherwise, then if the smallest difference is D2, this is recognized at 305 and bidirectional predictive coding of the macroblock is performed at 305A. The remaining macroblocks are dealt with in the same way at 306 and the frame counter is incremented at 307 prior to repeating the process from 301 for the next B-frame (unless (308) the last B-frame is now finished). If, however, the smallest difference is DF, then this is recognized at 309 and forward predictive coding performed at 310; otherwise (i.e., if the smallest difference is DB) backward predictive coding is performed at 311. Full details of these operations have not been given as they are entirely conventional.

In the modified motion estimation unit, a FLAG is initially set to zero in step 300 to indicate that no bidirectional coding has been employed. Note that, although not explicitly shown, there is a separate flag for each macroblock. Following step 305, if a decision has been taken to apply bidirectional predictive coding, an additional step 312 is included of setting FLAG to 1. Thus, if the process reaches the last B-frame of the sub-group (i.e., FC=M−1) and FLAG is still zero, it means that no bidirectional predictive coding has yet been performed for the particular macroblock within the current sub-group and, therefore, forcing is required. This condition is tested for at 313 and bidirectional coding initiated at 305A.

A further improvement in concealment efficiency (but again at the expense of a reduction in the efficiency of B-frame coding) may be made by a further modification to the encoder. Preferably, this is combined with the "bidirectional forcing" feature just described, although it can be used without it.

Normally, the two motion vectors for bidirectional coding of a B-frame are chosen independently (e.g., as in steps 301 and 302 of FIG. 8). Here, however, we subject the derivation of the two motion vectors to the constraint that their difference must equal the motion vector desired for concealment, e.g., for concealment in frame $P_7$:

$$V_{4 \to 9}^{fwd} - V_{7 \to 9}^{bwd} = V_{4 \to 7}^{fwd} \quad (2)$$

where it is understood that $V_{4 \to 7}^{fwd}$ is the optimum motion vector: in the case of a predicted macroblock of a P-frame, this would be identical to the vector actually transmitted with the P-frame.

This requires a joint derivation of the two vectors (forward and backward) which may be performed as set out in the pseudo-code which follows. Basically, the procedure is to consider each possible vector pair satisfying equation (3) and to determine the sum of absolute differences between the pixels of the current macroblock and the pixels of a macroblock-size region of the past anchor frame offset by the forward vector, and similarly for the future anchor frame. The two sums of differences are then added. The wanted vector pair is that for which this combined sum is a minimum.

---

Constrained Bidirectional Vector Procedure (1)

---

```
REM Target concealment vector is XT, YT
REM Forward vector is XF, YF
REM Backward vector is XB, YB
REM Search range is ±SRX, ±SRY
REM Do the following for each possible forward vector
FOR XF = -SRX TO SRX
FOR YF = -SRY TO SRY
    REM The constraint
    XB = XF - XT
    YB = YF - YT
    REM if the vector is out of range flag it to be disregarded
    IF (XB<-SRX OR XB>SRX OR YB<-SRY OR YB>SRY) THEN
        CSD(XF,YF) = some large number
        GOTO SKIP
    END IF
    FSD(XF,YF) = Sum of absolute differences between current
        macroblock pixels and past anchor frame region offset by XF,YF
    BSD(XB,YB) = Sum of absolute differences between current
        macroblock pixels and future anchor frame region offset by XR,YR
    CSD(XF,YF) = FSD(XF,YF) + BSD(XR,YR)    REM add the
sums of differences
    SKIP:
NEXT YF
NEXT XF
FIND X,Y for which CSD(X,Y) is minimum
Forward Vector = X,Y                  REM forward result
Backward Vector = X- XT, Y-YT         REM backward result
```

---

If preferred, the combined sum may be formed as a weighted sum of the individual sums, according to the relative temporal positions of the three frames—i.e., the line "CSD(XF,YF)=FSD(XF,YF)+BSD(XR,YR)" may be replaced by $$CSD(XF,YF) = TB * FSD(XF,YF) + TF * BSD(XR,YR)$$

where TF and TB have the meaning defined in the next example.

This method is relatively simple to implement, but may be non-optimum in that it results in a choice of a vector pair which minimizes the sum (or weighted sum) of the prediction error when using the forward vector alone for forward prediction and the prediction error when using the backward vector alone for backward prediction. The following modified example, on the other hand, aims to minimize the actual prediction error that occurs in bidirectional prediction. Basically, the procedure here is to consider each possible vector pair satisfying equation (3) and, in each case, to determine the actual bidirectionally predicted pixel values for the macroblock and hence calculate the sum of absolute differences between the pixels of the current macroblock and the pixels of the prediction. The wanted vector pair is that for which this combined sum is a minimum.

---

Constrained Bidirectional Vector Procedure (2)

---

```
REM Target concealment vector is XT, YT
REM Forward vector is XF, YF
REM Backward vector is XB, YB
REM Search range is ±SRX, ±SRY
REM Macroblock position is XM, YM
REM Macroblock size is MBX, MBY
REM Pixels of current frame are L(X,Y)
REM Pixels of past anchor frame are LAP(X,Y)
REM Pixels of future anchor frame are LAU(X,Y)
REM Time difference between current frame and future anchor frame as a
proportion of the time difference between the two anchor frames is TB
```

-continued

Constrained Bidirectional Vector Procedure (2)

```
REM Time difference between current frame and past anchor frame as a
proportion of the time difference between the two anchor frames is TF
REM Do the following for each possible forward vector
FOR XF = -SRX TO SRX
FOR YF = -SRY TO SRY
    REM The constraint
    XB = XF - XT
    YB = YF - YT
    REM if the backward vector is out of range flag it to be disregarded
    IF (XB<-SRX OR XB>SRX OR YB<-SRY OR YB>SRY) THEN
        CSD(XF,YF) = some large number
        GOTO SKIP
    END IF
    REM Initialize sum of differences
    CSD(XF,YF) = 0
    REM Do for each pixel of the current macroblock
    FOR XPOS = XM TO XM+MBX
    FOR YPOS = YM TO YM+MBY
        REM Find weighted bidirectional prediction
        LP = TB*LAP(XPOS+XF, YPOS+YF) +
        TF*(LAU(XPOS+XB, YPOS+YB)
        REM Accumulate absolute values of difference between
        pixel of current macroblock and that of the prediction
        CSD(XF,YF) = CSD(XF,YF) + ABS(LP-L(XPOS,YPOS))
    NEXT YPOS
    NEXT XPOS
    SKIP:
NEXT YF
NEXT XF
FIND X, Y for which CSD(X,Y) is minimum
Forward Vector = X,Y            REM forward result
Backward Vector = X- XT, Y-YT
REM backward result
```

There are a number of possible approaches to the application of this constraint:

a) the constraint is applied only to bidirectionally predicted macroblocks in the last B-frame. This gives a useful improvement, but is not optimum;

b) the constraint is applied to bidirectionally predicted macroblocks in all B-frames. This gives optimum concealment, but is wasteful in that where a particular macroblock is bidirectionally predicted in more than one B-frame, only one is used for concealment purposes;

c) the constraint is applied to all bidirectionally predicted macroblocks in the last B-frame, and to any bidirectionally predicted macroblock in an earlier frame only if the corresponding macroblock in a later frame is not bidirectionally predicted. This would avoid the waste referred to, but cannot be achieved unless the B-frames are coded in reverse order, involving extra delay which may or may not be acceptable, depending on the particular application; or d) the constraint is applied to all bidirectionally predicted macroblocks in the first B-frame, and to any bidirectionally predicted macroblock in a later frame only if the corresponding macroblock in an earlier frame is not bidirectionally predicted. This produces good results, but means that the order of priority used by the decoder to decide which of two or more bidirectionally predicted B-frames to use for generating estimated motion vectors for concealment then has to be the reverse of that described above. This would, of course, be quite possible to arrange, but would mean that the decoder would not be optimally configured for the decoding of signals coded using one of options (a) to (c) above, or using a conventional encoder.

Finally, with a view to mitigating the reduction in B-frame quality caused by the application of this constraint, we propose a modified scheme which, in selecting the B-frame motion vectors, aims to generate vectors which are, in essence, a compromise between those which would be generated by a conventional encoder and those produced by the method just described. This can be achieved by firstly deriving a vector pair satisfying equation 3, as described above, and then refining each vector separately by using the vector to define the center of a search area for a further search. Naturally, the search area should be smaller than the original search area (otherwise, the search might converge to the same value as would the conventional method).

What is claimed is:

1. A method of coding video signals including coding groups of frames by motion compensated predictive coding relative to two other frames as reference frames, in accordance with an algorithm in which a region of a frame of the group is coded by a selected one of a plurality of possible methods which includes:

a) forming the difference between that region and a portion of a first one of the reference frames, and a motion vector specifying the position of that portion of the first one of the reference frames relative to the region being coded;

b) forming the difference between that region and a portion of the second of the reference frames, and a motion vector specifying the position of that portion of the second of the reference frames relative to the region being coded; and c) forming the difference between that region and a combination of a portion of a first one of the reference frames and a portion of the second of the reference frames, a first motion vector specifying the position of that portion of the first one of the reference frames relative to the region being coded and a second motion vector specifying the position of that portion of the second of the reference frames relative to the region being coded;

enforcing that, for any region, that region is in one frame of the group coded using method (c) and the same region is, in other frames of the group, coded by one of said plurality of methods selected in dependence on a criterion as to the degree of similarity between the region being coded and, respectively, the said portion of the first reference frame, the said portion of the second reference frame and the said combination, wherein, in the frame(s) of the group other than one particular frame, each region is coded by one of said plurality of methods selected in dependence on said criterion; and in the particular frame of the group, each region is coded:

(i) in the event that that region has not, in the frame(s) of the group other than the particular frame, been coded using method (c), using method (c) irrespective of said criterion; and (ii) in the event that that region has, in the frame(s) of the group other than the particular frame, been coded using method (c), using one of said plurality of methods selected in dependence on said criterion.

2. A method according to claim 1 in which the particular frame is the last of the group.

3. A method according to claim 1 including:

generating a motion vector for prediction of a region of the second reference frame from a portion of the first reference frame, and wherein the selection of motion vectors for the coding using method (c) of at least one region of a frame of said group is subject to the constraint that a predetermined algebraic combination of the first and second motion vectors shall be equal to said motion vector.

4. An apparatus configured to perform the method of claim 1.

* * * * *